United States Patent
Umetsu et al.

(10) Patent No.: US 10,350,786 B2
(45) Date of Patent: Jul. 16, 2019

(54) CUTTING METHOD OF HONEYCOMB FORMED BODY, AND MANUFACTURING METHOD OF HONEYCOMB STRUCTURE

(71) Applicant: NGK INSULATORS, LTD., Nagoya (JP)

(72) Inventors: Nobuyuki Umetsu, Nagoya (JP); Takuya Yamada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 180 days.

(21) Appl. No.: 15/462,014

(22) Filed: Mar. 17, 2017

(65) Prior Publication Data

US 2017/0282404 A1 Oct. 5, 2017

(30) Foreign Application Priority Data

Mar. 31, 2016 (JP) .................................. 2016-071446

(51) Int. Cl.
*B28B 3/20* (2006.01)
*C04B 38/00* (2006.01)
(Continued)

(52) U.S. Cl.
CPC ........ *B28B 11/0845* (2013.01); *B24B 19/008* (2013.01); *B28B 3/20* (2013.01);
(Continued)

(58) Field of Classification Search
CPC .............. B28B 11/0845; B24B 19/008; B26D 2001/0046; B26D 1/143
(Continued)

(56) References Cited

U.S. PATENT DOCUMENTS 6,012,977 A * 1/2000 Yoshikawa .............. B24D 5/12
125/15
6,612,300 B2 9/2003 Mukota et al.
(Continued)

FOREIGN PATENT DOCUMENTS

| JP | 2003-053723 A1 | 2/2003 |
| JP | 2008-012786 A1 | 1/2008 |
| WO | 2009/108343 A2 | 9/2009 |

OTHER PUBLICATIONS

Machine translation of Tinschert, J. et al., Prinzipien der CAM-Bearbeitung—Subtraktive Verfahren. In: Oxidkeramkiden und CAD/CAM-Technologien: Atlas für Klinik, Labortecknik und Wertstoffkunde. Köln: Deutscher Zähnarzte Verlag, 2007. S. 84-86. Retrieved on Oct. 31, 2018 from Google Translate. (Year: 2007).*
(Continued)

*Primary Examiner* — Erin Snelting
(74) *Attorney, Agent, or Firm* — Burr & Brown, PLLC (57) ABSTRACT

The cutting method of a honeycomb formed body includes an end face cutting step of cutting both end faces of the ceramic honeycomb formed body before fired, by use of blade type rough-cutting grinding wheels in which coarse abrasive grain layers are formed; a honeycomb formed body rotating step of rotating the honeycomb formed body round a rotation axis which is a central axis perpendicular to the end faces of the honeycomb formed body; and an end face finishing step of disposing two finish-polishing grinding wheels via a predetermined distance so that finishing abrasive grain layers formed in the finish-polishing grinding wheels face each other, rotating the finish-polishing grinding wheels round a rotary shaft which is a central shaft of the finish-polishing grinding wheels, and moving the honeycomb formed body to pass the honeycomb formed body (Continued)

between the two finish-polishing grinding wheels, thereby finish-polishing cut surfaces which are cut.

13 Claims, 9 Drawing Sheets

(51) Int. Cl.
  *B28B 11/08* (2006.01)
  *B28B 11/12* (2006.01)
  *B24B 19/00* (2006.01)
  *C04B 35/195* (2006.01)

(52) U.S. Cl.
  CPC ............ *B28B 11/12* (2013.01); *C04B 35/195* (2013.01); *C04B 38/0006* (2013.01); *B28B 2003/203* (2013.01)

(58) Field of Classification Search
  USPC .............................. 144/367; 264/678; 407/64
  See application file for complete search history.

(56) References Cited

U.S. PATENT DOCUMENTS

| 8,701,646 B2 | 4/2014 | Boyko et al. |
| 2003/0029432 A1 | 2/2003 | Mukota et al. |
| 2015/0052757 A1 | 2/2015 | Okazaki |

OTHER PUBLICATIONS

German Office Action, German Application No. 10 2017 204 602.3, dated Feb. 2, 2018 (9 pages).

Tinschert, J. et al., Prinzipien der CAM-Bearbeitung—Subtraktive Verfahren. In: Oxidkeramiken und CAD/CAM-Technologien: Atlas für Klinik, Labortechnik und Wertstoffkunde. Köln: Deutscher Zahnärzte Verlag, 2007. S. 84-86.-ISBN 978-3-7691-3342.4 (9 pages).

\* cited by examiner

CUTTING METHOD OF HONEYCOMB FORMED BODY, AND MANUFACTURING METHOD OF HONEYCOMB STRUCTURE

The present application is an application based on JP-2016-071446 filed on Mar. 31, 2016 with Japan Patent Office, the entire contents of which are incorporated herein by reference.

BACKGROUND OF THE INVENTION

Field of the Invention

The present invention relates to a cutting method of a honeycomb formed body in which the honeycomb formed body is cut and its end faces are finished, and a manufacturing method of a honeycomb structure.

Description of the Related Art

In various fields of cars, chemistry, electric power, iron and steel, and others, a ceramic honeycomb structure which is excellent in heat resistance and corrosion resistance has been employed as a carrier in a catalyst device or a filter for use in an environmental measure, collection of specific substances or the like. Especially, in recent years, a plugged honeycomb structure obtained by alternately plugging open ends of cells in both end faces of a honeycomb structure has often been used as a diesel particulate filter (DPF) which traps particulate matter to be emitted from a diesel engine or the like. Furthermore, the honeycomb structure is manufactured through a forming step of mixing and preparing a forming raw material and then extruding the forming raw material into a desirable honeycomb shape through an extrusion machine, a raw cutting step of rawly cutting the extruded honeycomb formed body into a predetermined length, a drying step of drying the honeycomb formed body, a finishing step of finishing end faces of the dried honeycomb formed body, and a firing step of firing the honeycomb formed body.

In the raw cutting step, a longitudinal non-cut honeycomb formed body extruded by the extrusion machine is cut into the predetermined length by use of a cutting tool such as a fine metal wire. The honeycomb formed body immediately after extruded and before dried contains a large amount of water, and is soft. Therefore, the honeycomb formed body can easily be cut by utilizing the metal wire or the like. However, when the honeycomb formed body comes in contact with the metal wire, the whole shape of the honeycomb formed body might be deformed, or cut surfaces of the honeycomb formed body with the metal wire might be deformed (the cells are mainly deformed).

To eliminate such a problem, there is performed the finishing step of processing the end faces of the honeycomb formed body after the drying step and finishing the end faces to remove the cell deformation or the like generated in the above raw cutting step.

Usually, in the finishing step of finishing the end faces of the honeycomb formed body before fired, cut processing is performed by using an electrodeposited grinding wheel on which diamond abrasive grains are electrodeposited (e.g., Patent Document 1). The electrodeposited grinding wheel is a super-abrasive grinding wheel manufactured by continuing plating in a state where the abrasive grains are in contact with a circumferential end portion of a metal substrate, to fix the abrasive grains.

Figure 11:
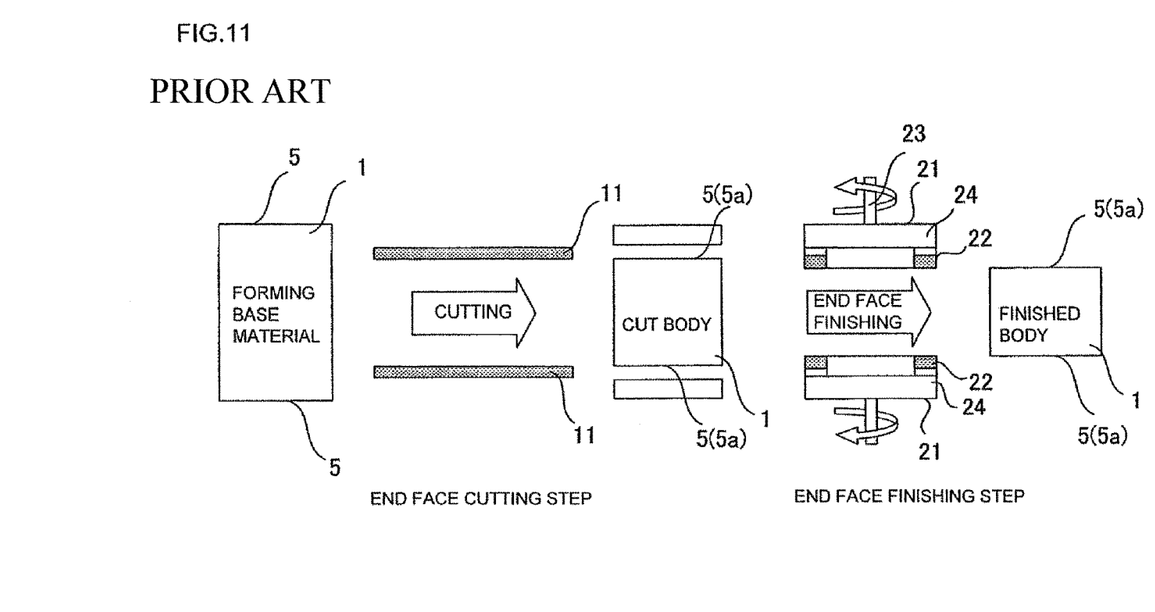
FIG. 11 is an explanatory view showing a conventional cutting method of a honeycomb formed body.

Alternatively, as shown in FIG. 11, there is used a two-stage processing method of cutting both end faces of a honeycomb formed body before fired, by use of blades, grinding wheels or the like, and then finishing the cut end faces with cup type grinding wheels (e.g., Patent Document 2).

[Patent Document 1] JP-A-2003-53723
[Patent Document 2] JP-A-2008-12786

SUMMARY OF THE INVENTION

However, use of electrodeposited grinding wheels to finish end faces of a honeycomb formed body before fired is not suitable for mass production of honeycomb structures, because the electrodeposited grinding wheel has a short life and is very expensive.

On the other hand, a blade, a grinding wheel, a cup type grinding wheel or the like has a long life and is inexpensive. However, when the honeycomb formed body before fired is cut with the blades or the grinding wheels, chipping or a cut between an outer wall and each partition wall is generated in the end faces of the honeycomb formed body. The chipping indicates that the partition walls of the end faces of the honeycomb formed body are chipped. The cut between the outer wall and the partition wall indicates a state where the outer wall is away from the partition wall in the end face of the honeycomb formed body, which is a state just before the chipping occurs. A honeycomb structure fired in a state where the cut between the outer wall and the partition wall is generated is easily chipped from a portion in which the cut between the outer wall and the partition wall is generated during transport, and hence the honeycomb structure might be treated as a defective product.

Furthermore, in a conventional method, the honeycomb formed body is cut with the blade or the grinding wheel, and then finish-polishing is performed with the cup type grinding wheel or the like to remove the chipping and the like, thereby finishing the end faces. However, even when the finish-polishing is deeply performed, the cut between the outer wall and the partition wall further advances inwardly in a longitudinal direction of the honeycomb formed body every time the polishing is performed, and hence the cut cannot be removed. Therefore, in the method of cutting the honeycomb formed body with the blade or the grinding wheel and then finishing the end faces with the cup type grinding wheel or the like, there is the problem that a large amount of defective products are generated and hence the method is not suitable for industrial production.

In view of the above problem, an object of the present invention is to provide a cutting method of a honeycomb formed body in which end faces of the honeycomb formed body before fired are inexpensively and suitably cut and finished, and a manufacturing method of a honeycomb structure which includes the cutting method.

To achieve the above object, according to the present invention, there are provided a cutting method of a honeycomb formed body before fired, and a manufacturing method of a honeycomb structure as follows.

According to a first aspect of the present invention, a cutting method of a honeycomb formed body is provided including an end face cutting step of cutting both end faces of a ceramic honeycomb formed body before fired, by use of blade type rough-cutting grinding wheels in which coarse abrasive grain layers are formed; a honeycomb formed body rotating step of, after the end face cutting step, rotating the honeycomb formed body round a rotation axis which is a central axis perpendicular to the end faces of the honeycomb formed body so that a loaded region to which a load is applied when cutting the end face is different from a loaded region to which a load is applied when finish-polishing the end face; and an end face finishing step of, after the honeycomb formed body rotating step, disposing two finish-polishing grinding wheels via a predetermined distance so that finishing abrasive grain layers formed in the finish-polishing grinding wheels face each other, rotating the finish-polishing grinding wheels round a rotary shaft which is a central shaft of the finish-polishing grinding wheels, and moving the honeycomb formed body in a direction perpendicular to the rotary shaft to pass the honeycomb formed body between the two finish-polishing grinding wheels, thereby finish-polishing cut surfaces which are cut.

According to a second aspect of the present invention, the cutting method of the honeycomb formed body according to the above first aspect is provided, wherein in the honeycomb formed body rotating step, the honeycomb formed body is rotated as much as 90° to 270°.

According to a third aspect of the present invention, the cutting method of the honeycomb formed body according to the above first or second aspects is provided, wherein in the end face cutting step, a pair of blade type rough-cutting grinding wheels disposed to face the end faces of the honeycomb formed body are used, the rough-cutting grinding wheels are rotated round the rotation axis in a direction perpendicular to the end faces, and the honeycomb formed body is moved in a direction perpendicular to the rotation axis to pass the honeycomb formed body between the two rough-cutting grinding wheels, thereby cutting the end faces.

According to a fourth aspect of the present invention, the cutting method of the honeycomb formed body according to the above third aspect is provided, wherein in the end face cutting step, the rough-cutting grinding wheel is rotated at a rotation number of 2300 to 2600 rpm.

According to a fifth aspect of the present invention, the cutting method of the honeycomb formed body according to any one of the above first to fourth aspects is provided, wherein in the rough-cutting grinding wheel, the coarse abrasive grain layer is formed on a circumferential surface and a disc surface of a disc-shaped grinding wheel substrate.

According to a sixth aspect of the present invention, the cutting method of the honeycomb formed body according to any one of the above first to fifth aspects is provided, wherein a grain size of the rough-cutting grinding wheel is from #60 to #140.

According to a seventh aspect of the present invention, the cutting method of the honeycomb formed body according to any one of the above first to sixth aspects is provided, wherein the rough-cutting grinding wheel is formed by a metal bond.

According to an eighth aspect of the present invention, the cutting method of the honeycomb formed body according to any one of the above first to seventh aspects is provided, wherein in the end face finishing step, the cut surface is polished to a depth of 5 mm or less with the finish-polishing grinding wheel.

According to a ninth aspect of the present invention, the cutting method of the honeycomb formed body according to any one of the above first to eighth aspects is provided, wherein as the finish-polishing grinding wheel, a cup type grinding wheel is used in which the finishing abrasive grain layer is formed on a surface of a circumferential portion which faces the other finish-polishing grinding wheel.

According to a tenth aspect of the present invention, the cutting method of the honeycomb formed body according to any one of the above first to ninth aspects is provided, wherein in the finish-polishing grinding wheel, a tapered portion is formed on a grinding surface side of a circumferential edge of the finishing abrasive grain layer.

According to an eleventh aspect of the present invention, the cutting method of the honeycomb formed body according to the above tenth aspect is provided, wherein an angle formed between a tapered surface of the tapered portion and a virtual extension line extended from the surface of the finishing abrasive grain layer disposed on the grinding surface is set to a range of 26° to 310, and a height of the tapered portion is 5 mm or more.

According to a twelfth aspect of the present invention, the cutting method of the honeycomb formed body according to any one of the above first to eleventh aspects is provided, wherein in the end face finishing step, the finish-polishing grinding wheel is rotated at a rotation number of 2290 rpm or less.

According to a thirteenth aspect of the present invention, the cutting method of the honeycomb formed body according to any one of the above first to twelfth aspects is provided, wherein a grain size of the finish-polishing grinding wheel is from #100 to #140.

According to a fourteenth aspect of the present invention, a manufacturing method of a honeycomb structure which includes the cutting method of the honeycomb formed body according to any one of the above first to thirteenth aspects is provided, the manufacturing method of the honeycomb structure including a firing step of firing the honeycomb formed body after a forming raw material is formed, and the end faces of the honeycomb formed body having partition walls defining a plurality of cells which become through channels for fluid and extend from one end face to the other end face and formed by extrusion, cutting and drying are roughly cut and finish-polished.

A cutting method of a honeycomb formed body of the present invention is directed to a cutting method by polishing in two stages of cutting the honeycomb formed body by use of blade type rough-cutting grinding wheels in which coarse abrasive grain layers are formed, and polishing cut surfaces by use of finish-polishing grinding wheels, and hence inexpensive long-life polishing grinding wheels are usable in both the stages, thereby enabling cost reduction. In a conventional method, even when performing finish-polishing by use of cup type grinding wheels or the like, a cut between an outer wall and each partition wall which is generated in an end face cutting step advances, and hence the cut cannot be removed. However, in the present invention, after the end face cutting step, there is performed a honeycomb formed body rotating step of rotating the honeycomb formed body as much as 90° or more round a rotation axis which is a central axis perpendicular to end faces of the honeycomb formed body, and next there is performed an end face finishing step of moving the honeycomb formed body in a direction perpendicular to the rotary shaft to pass the honeycomb formed body between two finish-polishing grinding wheels, thereby finish-polishing the cut surfaces. Consequently, it is possible to suitably perform finishing without advancing the cut between the outer wall and the partition wall which is generated in each cut surface in an inner direction of the honeycomb formed body.

Furthermore, in a honeycomb structure manufactured by a manufacturing method of the honeycomb structure which has a firing step of firing the honeycomb formed body after the honeycomb formed body is cut by the cutting method of the present invention, there are not any defects such as the cut between the outer wall and the partition wall, and hence

BRIEF DESCRIPTION OF THE DRAWINGS

FIG. 4B is an explanatory view in which FIG. 4A is partially enlarged;

DESCRIPTION OF THE PREFERRED EMBODIMENTS

Hereinafter, embodiments of the present invention will be described with reference to the drawings. The present invention is not limited to the following embodiments, and changes, modifications and improvements are addable without departing from the gist of the present invention.

(Outline)

Figure 1:
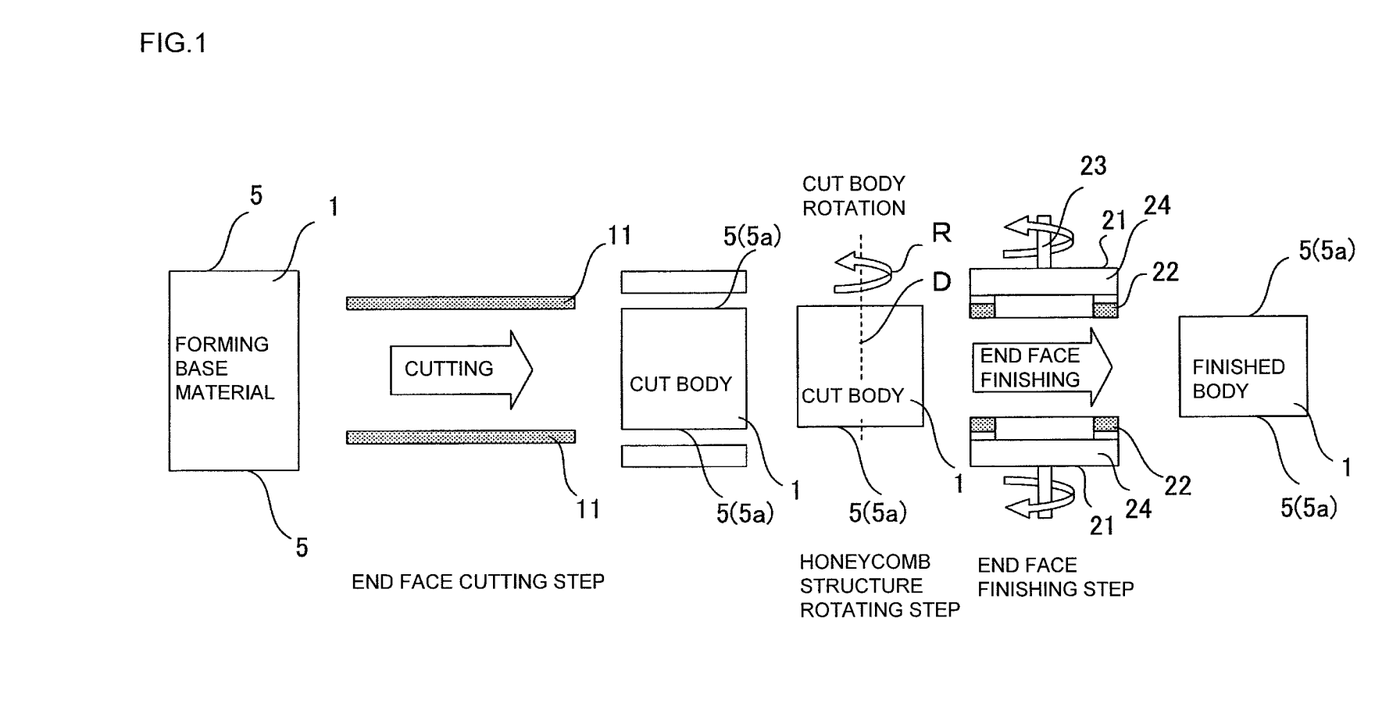
FIG. 1 is an explanatory view showing one example of a cutting method of a honeycomb formed body of the present invention.

FIG. 1 shows a cutting method of a honeycomb formed body 1 of the present invention. The cutting method of the present invention includes an end face cutting step of cutting both end faces 5 of the ceramic honeycomb formed body 1 before fired, a honeycomb formed body rotating step of rotating the honeycomb formed body 1, and an end face finishing step of finish-polishing cut surfaces 5a which are cut. Specifically, the end face cutting step is a step of cutting both the end faces 5 of the ceramic honeycomb formed body 1 before fired by use of blade type rough-cutting grinding wheels 11 in which coarse abrasive grain layers 12 are formed. The honeycomb formed body rotating step is a step of rotating the honeycomb formed body 1 round a rotation axis which is a central axis perpendicular to the end faces 5 of the honeycomb formed body 1 so that a loaded region to which a load is applied when cutting the end face 5 is different from a loaded region to which a load is applied when finish-polishing the end face 5. In the end face finishing step, two finish-polishing grinding wheels 21 are disposed via a predetermined distance so that finishing abrasive grain layers 22 formed in the finish-polishing grinding wheels 21 face each other, rotating the finish-polishing grinding wheels 21 round a rotary shaft which is a central shaft 23 of the finish-polishing grinding wheels 21, and moving the honeycomb formed body 1 in a direction perpendicular to the rotary shaft to pass the honeycomb formed body between the two finish-polishing grinding wheels 21, thereby finish-polishing the cut surfaces 5a which are cut.

(End Face Cutting Step)

The end face cutting step is the step of cutting both the end faces 5 of the ceramic honeycomb formed body 1 before fired, by use of the blade type rough-cutting grinding wheels 11 in which the coarse abrasive grain layers 12 are formed. The blade type rough-cutting grinding wheels 11 have a long life and is inexpensive, and hence the use of this wheel leads to cost reduction in manufacturing a honeycomb structure. Furthermore, it is preferable that a pair of blade type rough-cutting grinding wheels 11 disposed to face the end faces 5 of the honeycomb formed body 1 are used, the rough-cutting grinding wheels 11 are rotated round the rotation axis in a direction perpendicular to the end faces 5, and the honeycomb formed body 1 is moved in a direction perpendicular to the rotation axis to pass the honeycomb formed body between the two rough-cutting grinding wheels 11, thereby cutting the end faces.

Figure 2:
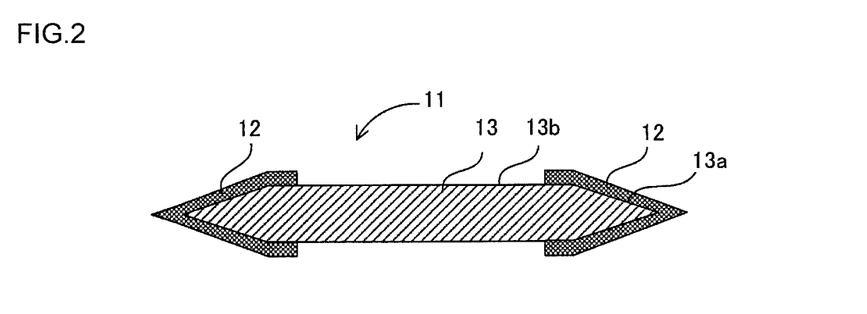
FIG. 2 is a schematic cross-sectional view showing one example of a blade type rough-cutting grinding wheel.

FIG. 2 shows the blade type rough-cutting grinding wheel 11. It is preferable that in the rough-cutting grinding wheel 11, the coarse abrasive grain layer 12 is formed on a circumferential surface 13a and a disc surface 13b of a disc-shaped grinding wheel substrate 13. By use of the blade type rough-cutting grinding wheel 11, both the end faces 5 of the honeycomb formed body 1 before fired can be cut and removed. It is preferable that the grinding wheel substrate 13 is made of a plate-shaped metal and that the coarse abrasive grain layer 12 obtained by bonding abrasive grains by a metal bond or the like is formed in at least a part of each of the circumferential surface 13a and the disc surface 13b.

It is preferable that the pair of rough-cutting grinding wheels 11 are disposed away from each other as much as a space corresponding to a predetermined length of the honeycomb formed body 1, in a state where the coarse abrasive grain layers 12 disposed on the disc surfaces 13b of the grinding wheel substrates 13 face each other. The rough-cutting grinding wheels 11 attached to an end face cutting device rotate at a synchronized rotation number in a predetermined rotating direction round the rotation axis. It is further preferable that the honeycomb formed body 1 is conveyed between the pair of rotating rough-cutting grinding wheels 11 to cut the end faces.

The honeycomb formed body 1 which comes close to the rotating rough-cutting grinding wheels 11 first comes in contact with the coarse abrasive grain layers 12 positioned on the circumferential surfaces 13a of the rough-cutting grinding wheels 11. Further specifically, a circumferential portion of the honeycomb formed body 1 which includes a corner portion comes in contact with the coarse abrasive grain layer 12 positioned on the circumferential surface 13a of the rough-cutting grinding wheel 11. Furthermore, it is preferable to rotate the rough-cutting grinding wheel 11 at a rotation number of 2300 to 2600 rpm. The rotation number is more preferably from 2500 to 2600 rpm and further preferably 2600 rpm.

Here, the coarse abrasive grain layer 12 is formed by using abrasive grains having large grain diameters, and hence, with the conveyance of the honeycomb formed body 1, an amount of the end face 5 to be ground per contact can be increased in cutting the end face. It is preferable that a grain size of the rough-cutting grinding wheel 11 is from #100 to #170.

Figure 3:
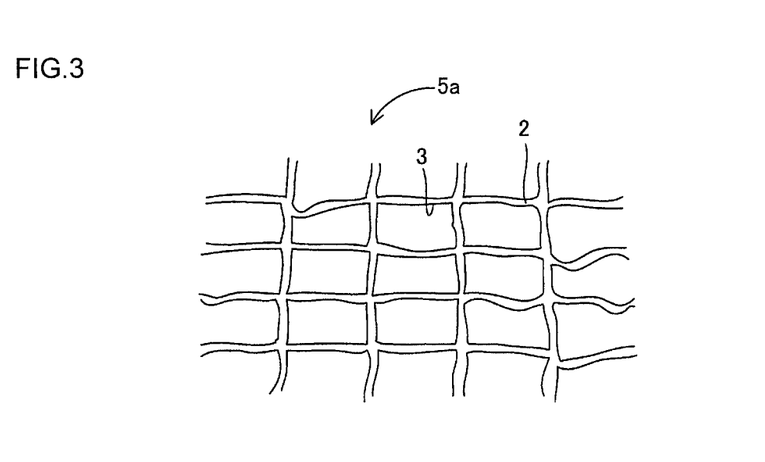
FIG. 3 is an explanatory view showing a part of a cut surface after an end face cutting step.
Figure 5:
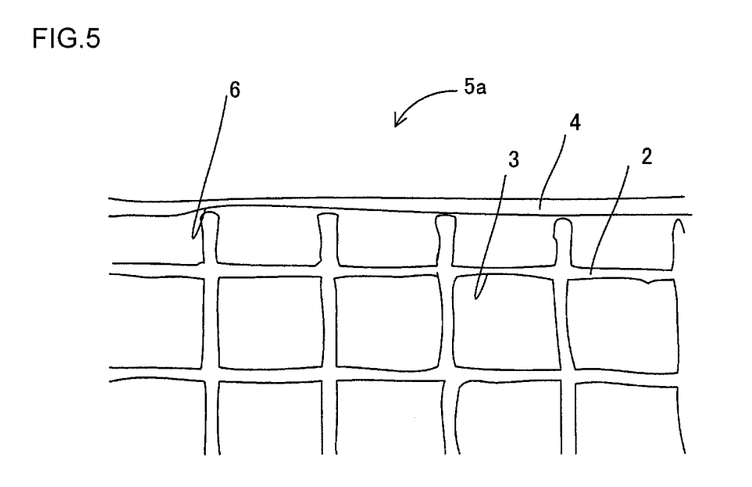
FIG. 5 is an explanatory view showing a part of the cut surface in which a cut between an outer wall and each partition wall is formed.

FIG. 3 and FIG. 5 show the cut surface 5*a* of the honeycomb formed body 1 after the end face cutting step is performed. As shown in FIG. 3, the cut surface 5*a* of the honeycomb formed body 1 after the end face cutting step is performed is very rough. Furthermore, as shown in FIG. 5, a cut 6 is generated between an outer wall 4 and each partition wall 2 in a part of the cut surface 5*a*. An example of a cause for the generation of the cut 6 between the outer wall 4 and the partition wall 2 is the use of the blade type rough-cutting grinding wheels in the end face cutting step.

Figure 4A:
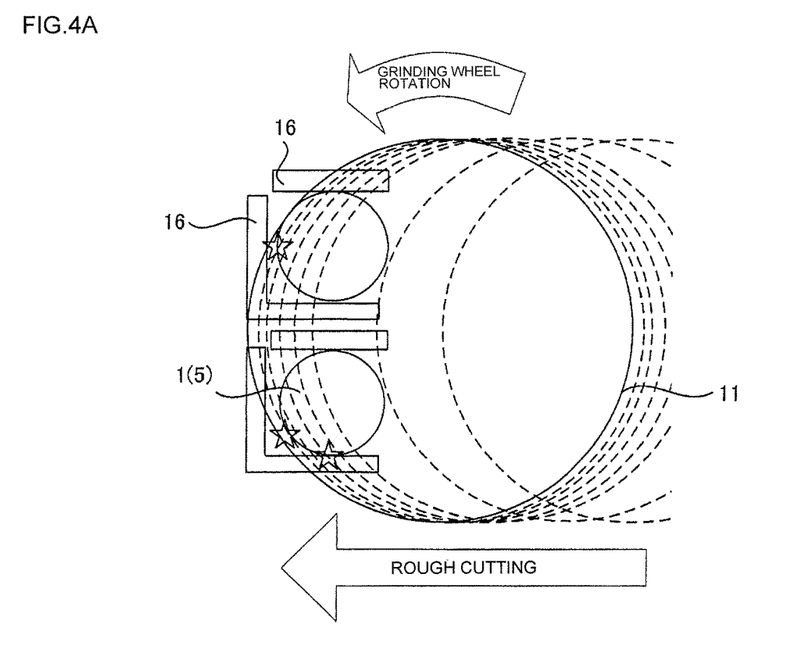
FIG. 4A is an explanatory view showing one example of the end face cutting step.
Figure 4B:
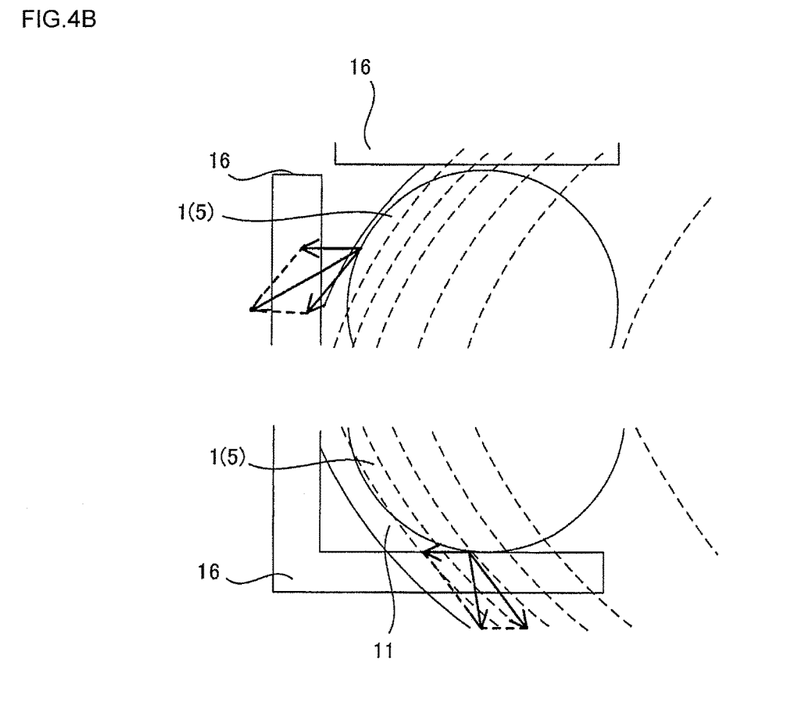

FIG. 4A is an explanatory view of the end face cutting step and shows a view when the honeycomb formed body is seen from one end face side. FIG. 4B is a partially enlarged view around star marks of FIG. 4A. As shown in FIG. 4A and FIG. 4B, the honeycomb formed body 1 fixed with pressing members 16 is passed while rotating the rough-cutting grinding wheel 11, and hence a resultant force of forward movement and downward cutting of the grinding wheel is concentrated in a direction to peel the outer wall 4 of the honeycomb formed body 1 from the partition walls 2. Furthermore, when a cut region drops down, a force is concentrated in a direction in which the outer wall 4 of the honeycomb formed body 1 is peeled. It is to be noted that in FIG. 4A, loaded regions with the forces during this cutting are shown with the star marks. In FIG. 4B, arrow marks show resultant forces of the forward movement and downward cutting of the grinding wheel.

Due to such a resultant force of the forward movement and downward cutting of the rough-cutting grinding wheel 11, as shown in FIG. 5, the outer wall 4 comes away from the partition wall 2 to generate a clearance during the cutting, and the cut 6 between the outer wall 4 and the partition wall 2 is generated, which results in a state just before the outer wall 4 is chipped. The honeycomb formed body 1 in which the cut 6 between the outer wall 4 and the partition wall 2 has entered the cut surface 5*a* easily chips from a region of the cut 6 due to vibration or the like during transport of the fired honeycomb structure, and hence the honeycomb structure becomes a defective product. Consequently, in the region where the cut 6 between the outer wall 4 and the partition wall 2 has entered, it is necessary to perform polishing or the like to a depth of the cut 6 or more and to completely remove the cut 6.

In this way, the cut surface 5*a* of the honeycomb formed body 1 which is cut in the end face cutting step is very rough, and hence the end face finishing step is performed later. In the end face finishing step, chamfering and end face finishing of the cut surface 5*a* can be performed to obtain a smooth state of the cut surface 5*a* of the honeycomb formed body 1. At this time, a height of the honeycomb formed body 1 is determined in accordance with a distance between the pair of finish-polishing grinding wheels 21. Consequently, in the end face cutting step, chipping of the cut surface 5*a* or the generation of the cut 6 between the outer wall and the partition wall is allowed. Furthermore, an accuracy of a cut height of the honeycomb formed body 1 in the previously performed end face cutting step is not required to be high.

(Honeycomb Formed Body Rotating Step)

Figure 6:
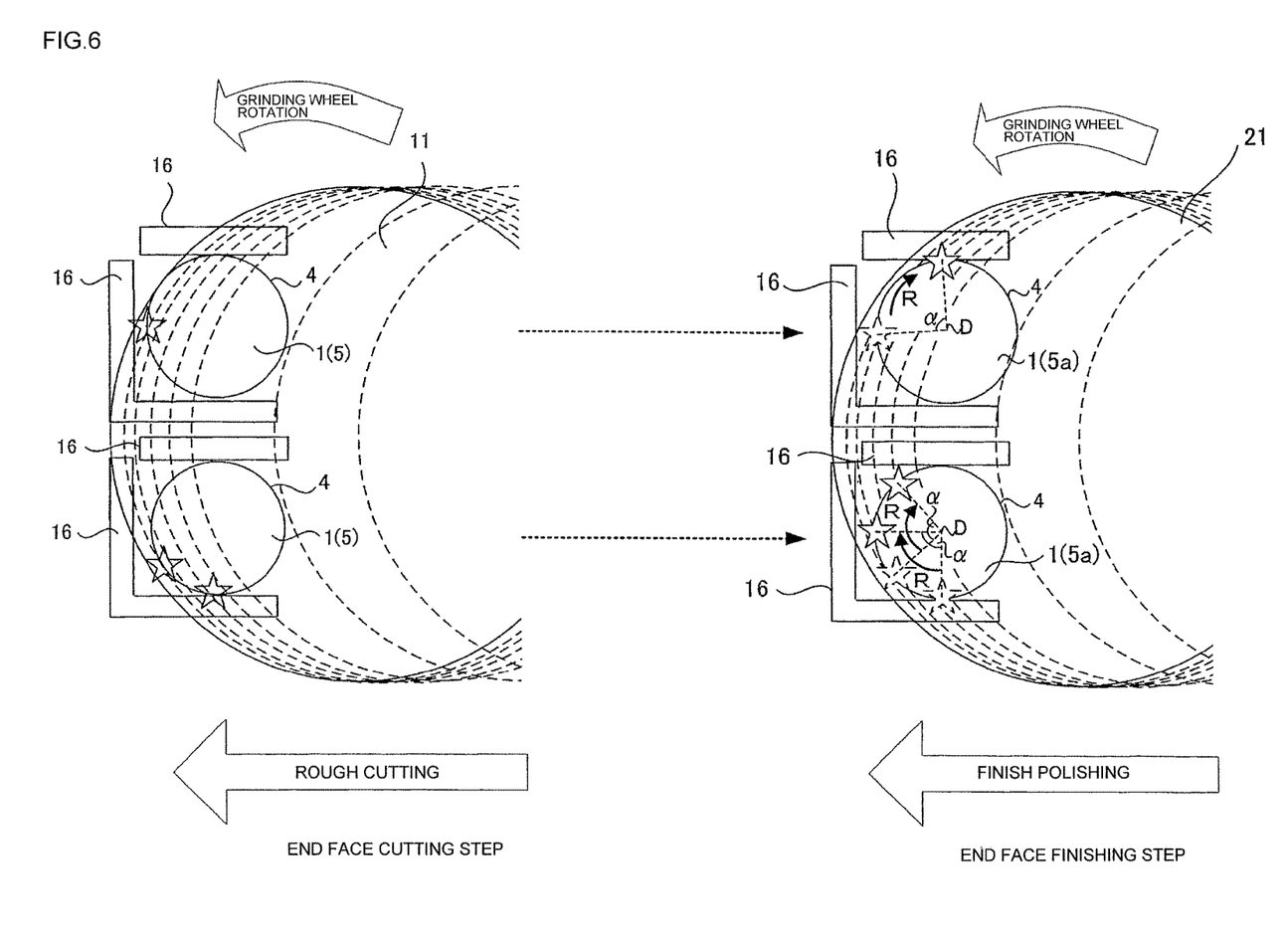
FIG. 6 is an explanatory view showing one example of a honeycomb formed body rotating step.

FIG. 6 shows the honeycomb formed body rotating step. In the present invention, before performing the end face finishing step, there is performed the honeycomb formed body rotating step of rotating the honeycomb formed body 1 round a rotation axis which is a central axis D perpendicular to the end faces 5 of the honeycomb formed body 1 so that the loaded region to which the load is applied when cutting the end face 5 is different from the loaded region to which the load is applied when finish-polishing the end face 5. Here, a left view of FIG. 6 shows the end face cutting step, and a right view thereof shows the end face finishing step after the honeycomb formed body rotating step is performed. The end face finishing step shown on the right side of FIG. 6 is performed after the honeycomb formed body rotating step is performed, and hence a position of the cut 6 between the outer wall 4 and the partition wall 2, i.e., the loaded region (shown by a solid-line star mark) to which the load is applied when cutting the end face 5 is moved. It is to be noted that an angle at which the region of the cut 6 generated in the end face cutting step is rotated round the rotation axis which is the central axis D of the honeycomb formed body 1 is denoted with α, and a rotating direction is denoted with R. Specifically, in the honeycomb formed body rotating step, before performing the end face finishing step, the honeycomb formed body 1 is rotated round the rotation axis of the central axis D so that the region of the cut 6 between the outer wall 4 and the partition wall 2 (the solid-line star mark of the left view) is moved from a position at which the region where the cut 6 has entered during the cutting is disposed (a position shown by a dot-line star mark in the right view), and is disposed at a position to which the honeycomb formed body 1 is rotated (a position shown by a solid-line star mark on the right view). When the honeycomb formed body rotating step is performed, it is possible to completely grind off a portion of the cut 6 between the outer wall 4 and the partition wall 2 which is generated in the end face cutting step, in the subsequent end face finishing step, and the honeycomb formed body 1 which can be treated as a good product can be manufactured. Furthermore, it is preferable that in the honeycomb formed body rotating step, the honeycomb formed body 1 is rotated round the rotation axis of the central axis D as much as 90° to 270° in the rotating direction R.

Furthermore, for example, in a case where the end face cutting step and the end face finishing step are performed while conveying the honeycomb formed body 1 and conveyance lines are not present on one straight line in the end face cutting step and the end face finishing step, the portion of the cut 6 between the outer wall 4 and the partition wall 2 which is generated during the cutting may be different from the loaded region with the force in the finish-polishing of the end face finishing step.

Figure 12:
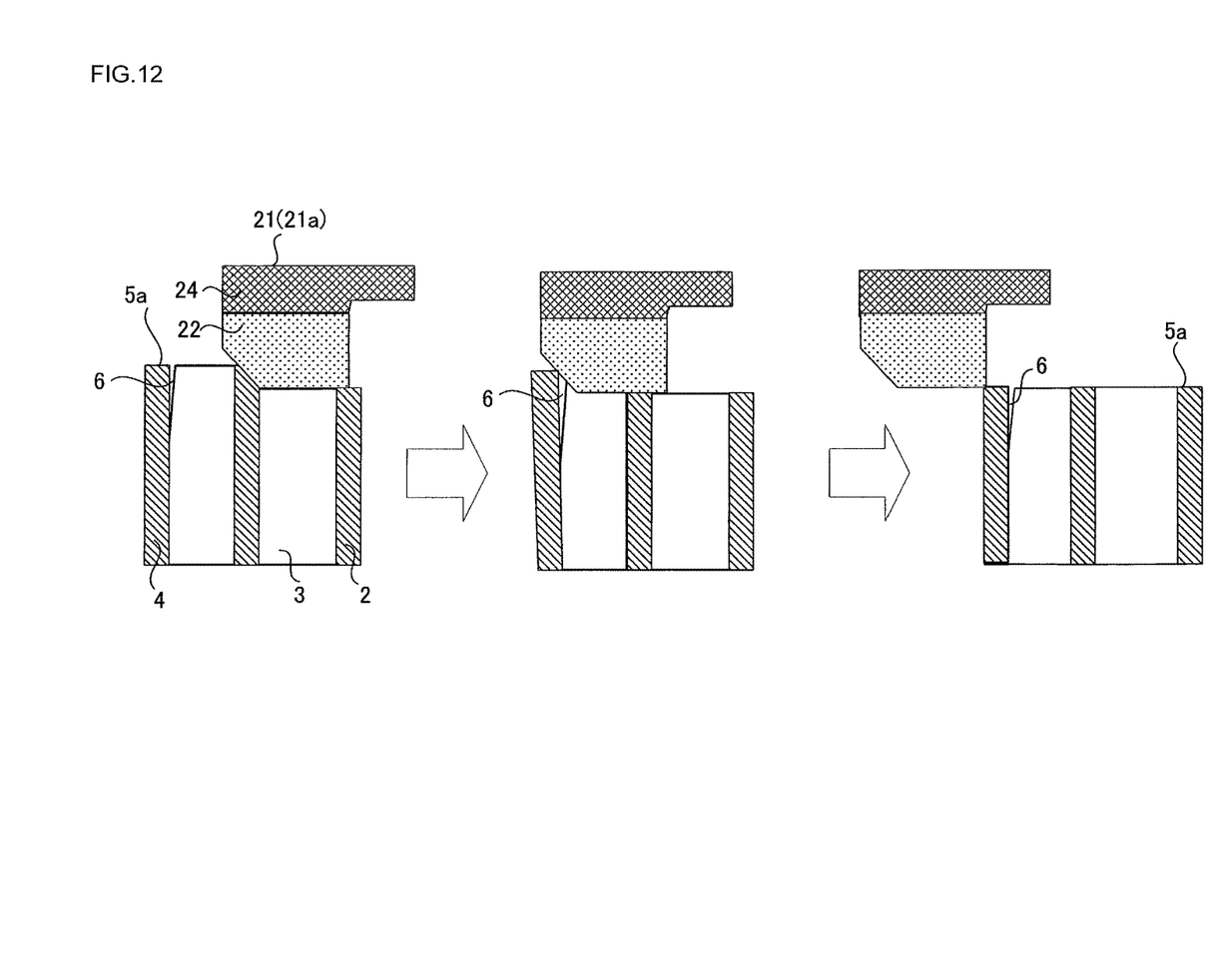
FIG. 12 is an explanatory view showing an example where a cut between an outer wall and each partition wall advance due to a conventional finishing step.

On the other hand, FIG. 11 shows a conventional method in which the honeycomb formed body rotating step of the present invention is not performed. In this conventional method, for the purpose of finish-polishing a cut surface 5*a* as it is cut, a resultant force of forward movement and grinding of each finish-polishing grinding wheel 21 is concentrated on the same region as a region where a cut 6 between an outer wall 4 and a partition wall 2 has entered in the cut surface 5*a* of a honeycomb formed body 1. Therefore, as shown in FIG. 12, the cut 6 between the outer wall and the partition wall which is generated in an end face cutting step might deeply develop toward a direction parallel to a longitudinal direction of the honeycomb formed body 1 due to the finish-polishing. In this way, the cut 6 between the outer wall 4 and the partition wall 2 which has entered the cut surface 5*a* develops every time the finish-polishing is performed, and even when the polishing is deeply performed, there is the possibility that the cut 6 generated once cannot be ground off.

Figure 7:
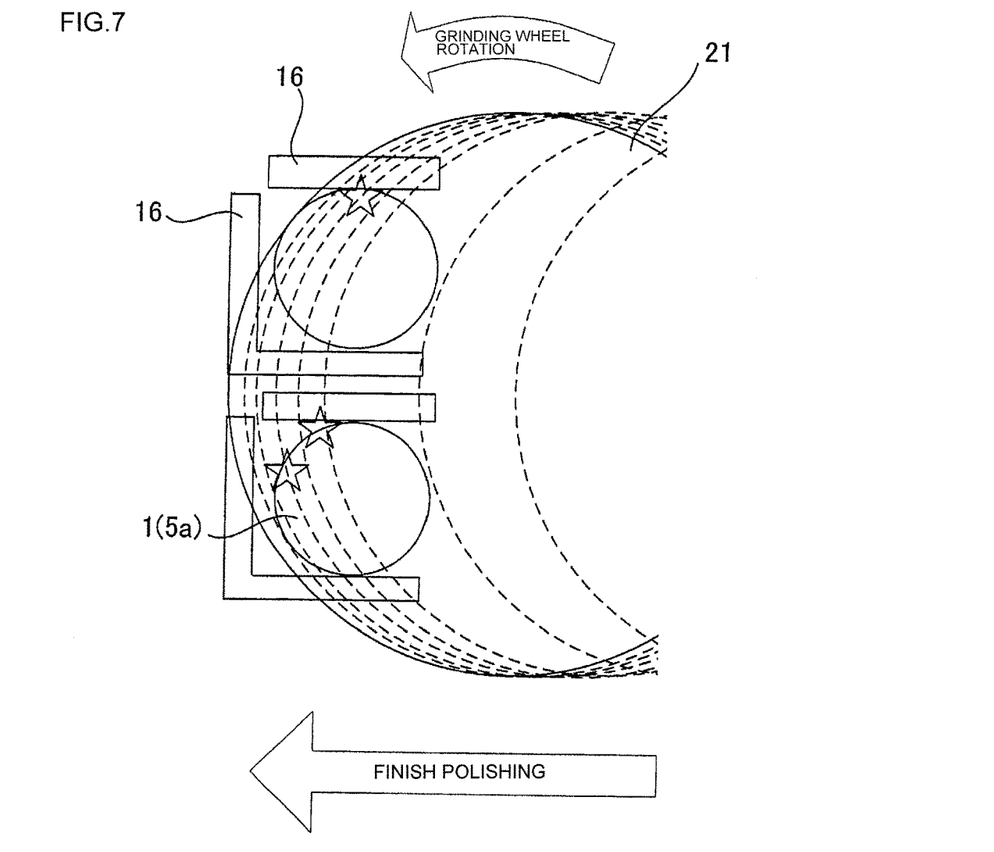
FIG. 7 is an explanatory view showing one example of an end face finishing step.

FIG. 7 shows the end face finishing step after the honeycomb formed body rotating step. As shown in FIG. 7, when performing the honeycomb formed body rotating step of the present invention, a loaded position with a force applied to the cut surface 5a of the honeycomb formed body 1 in the end face finishing step can be changed. That is, in the end face finishing step, the polishing can be performed by concentrating a force on a position other than the loaded position with the concentrated force during the cutting in the end face cutting step (a position of the cut surface 5a at which the cut 6 between the outer wall 4 and the partition wall 2 is not generated). Consequently, in the end face finishing step, the finish-polishing of the cut surface 5a can be performed without advancing the cut 6 between the outer wall 4 and the partition wall 2, and the cuts 6 between the outer wall 4 and the partition walls 2 which are generated in the finished end faces 5 of the honeycomb formed body can noticeably be decreased.

(End Face Finishing Step)

Next, the end face finishing step will be described. As shown in FIG. 1, in the end face finishing step, two finish-polishing grinding wheels 21 are disposed via the predetermined distance so that the finishing abrasive grain layers 22 formed in the finish-polishing grinding wheels 21 face each other. Then, the finish-polishing grinding wheels 21 are rotated round the rotary shaft of the central shaft 23, and the honeycomb formed body 1 is moved in the direction perpendicular to the rotary shaft to pass the honeycomb formed body between the two finish-polishing grinding wheels 21, thereby finish-polishing the cut surfaces 5a which are cut. By performing the end face finishing step, both the cut surfaces 5a which are roughly cut in the end face cutting step are ground off, the cut surfaces 5a are suitably smoothly finished, and the height of the honeycomb formed body 1 can be determined in accordance with the distance between the finish-polishing grinding wheels 21.

Thus, in the end face finishing step, the chipping or the cut 6 between the outer wall 4 and the partition wall 2 which is generated in the cut surfaces 5a in the end face cutting step is ground. When a depth of the cut 6 between the outer wall 4 and the partition wall 2 which is generated in the end face 5 of the honeycomb formed body 1 after the end face cutting step is measured, the cut 6 between the outer wall 4 and the partition wall 2 which has a depth of about 2.4 mm at maximum is measured. Therefore, it is preferable that in the end face finishing step, the cut surface 5a is polished to a depth of 5 mm or less with the finish-polishing grinding wheel 21. When the cut surface 5a of the honeycomb formed body 1 is polished to the depth of 5 mm or less, it is possible to completely remove the chipping and the cut 6 between the outer wall and the partition wall which are generated in the cut surface 5a. Furthermore, it is preferable to suitably determine the depth to which the finish-polishing is to be performed, in accordance with the depth of the chipping or the cut 6 between the outer wall and the partition wall and a desirable length of the honeycomb formed body 1 in the longitudinal direction.

It is preferable that as the finish-polishing grinding wheel 21, a cup type grinding wheel 21a is used in which the finishing abrasive grain layer 22 is formed on a surface of a circumferential portion which faces the other finish-polishing grinding wheel 21. In the cup type grinding wheel 21a, an abrasive grain layer is intermittently or continuously disposed along a circumferential edge of a side surface on a side opposite to the surface of a cup-shaped substrate 24 on which the central shaft is disposed, and the abrasive grain layer of the rotating cup type grinding wheel 21a is brought into sliding contact with the surface of a target to be polished, to perform grind processing. As abrasive grains constituting the abrasive grain layer, abrasive grains made of diamond are suitably employable. Further, as a bond (a bonding agent) to form the abrasive grain layer, a resin metal bond or a resin bond is employable. It is also preferable that a grain size of the finish-polishing grinding wheel 21 is from #100 to #140. It is further preferable to use the finishing abrasive grain layer 22 having a thickness of 5 mm or more.

Figure 8:
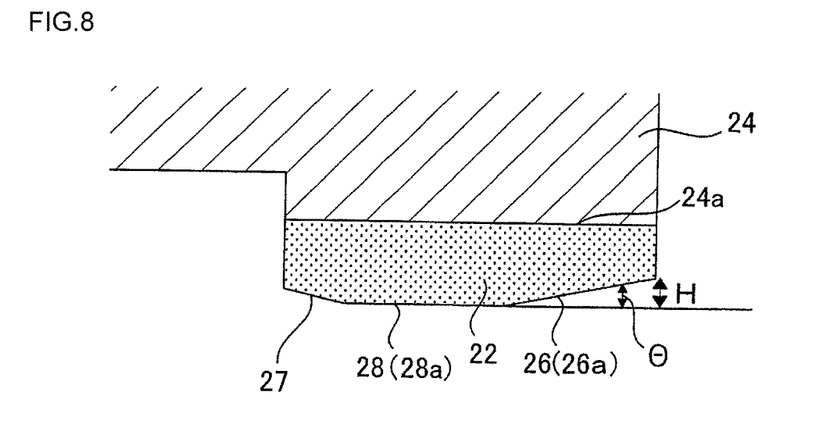
FIG. 8 is a partially enlarged view showing one example of a cup type grinding wheel.

FIG. 8 shows an enlarged view of the cup type grinding wheel 21a. It is preferable that the finishing abrasive grain layer 22 is formed on the surface of a circumferential portion 24a of the cup type grinding wheel 21a which faces the other finish-polishing grinding wheel 21. Furthermore, it is preferable that in the finish-polishing grinding wheel 21, a tapered portion 26 is formed on a grinding surface side of a circumferential edge of the finishing abrasive grain layer 22. With the tapered portion 26, chamfer processing of the cut surface 5a of the honeycomb formed body 1 moving from a circumferential side to an inner peripheral side of the cup type grinding wheel 21a can mainly be performed. Furthermore, with the tapered portion 26 on the grinding surface side of the circumferential edge of the finishing abrasive grain layer 22, it is possible to decrease a shock when the honeycomb formed body 1 moving inwardly from the circumferential side of the cup type grinding wheel 21a abuts on the cup type grinding wheel 21a, and it is therefore possible to prevent the chipping of the cut surface 5a of the honeycomb formed body 1. Furthermore, in the cup type grinding wheel 21a, an inner peripheral side tapered portion 27 may be formed on a grinding surface side of an inner peripheral edge of the finishing abrasive grain layer 22. The inner peripheral side tapered portion 27 of the inner peripheral edge is disposed to decrease damages when the honeycomb formed body 1 moving from a central side to the circumferential side abuts on the inner peripheral edge in a case of processing the honeycomb formed body 1 having a diameter smaller than a diameter of a circle formed around the central shaft 23 by the finishing abrasive grain layer 22. It is to be noted that a flat portion 28 of the cup type grinding wheel 21a is disposed to determine the height of the honeycomb formed body 1. The grinding is performed by using the cup type grinding wheel 21a, whereby vibration during the grinding can be suppressed and the generation of the chipping of the cut surface 5a can be inhibited.

It is preferable that an angle θ formed by a tapered surface 26a of the tapered portion 26 and a virtual extension line extended from a surface 28a of the finishing abrasive grain layer 22 disposed on the grinding surface is set to a range of 26° to 31°, and a height H of the tapered portion is 5 mm or more. It is more preferable that the angle θ to be formed is from 26°34' to 30°30'. When the angle θ to be formed is smaller than 26°, a processing load between the tapered surface and the honeycomb formed body 1 of a finish-polishing target increases. On the other hand, when the angle is larger than 31°, a distance of the tapered surface 26a of the tapered portion 26 increases, and much time might be required in processing the honeycomb formed body 1 to its final length. Therefore, it is preferable that the angle θ to be formed is set to the above range. It is to be noted that the height H of the tapered portion of the finish-polishing abrasive grain layer is 5 mm or more, whereby the cut 6 between the outer wall and the partition wall which has entered the cut surface 5a can sufficiently be ground.

Figure 9:
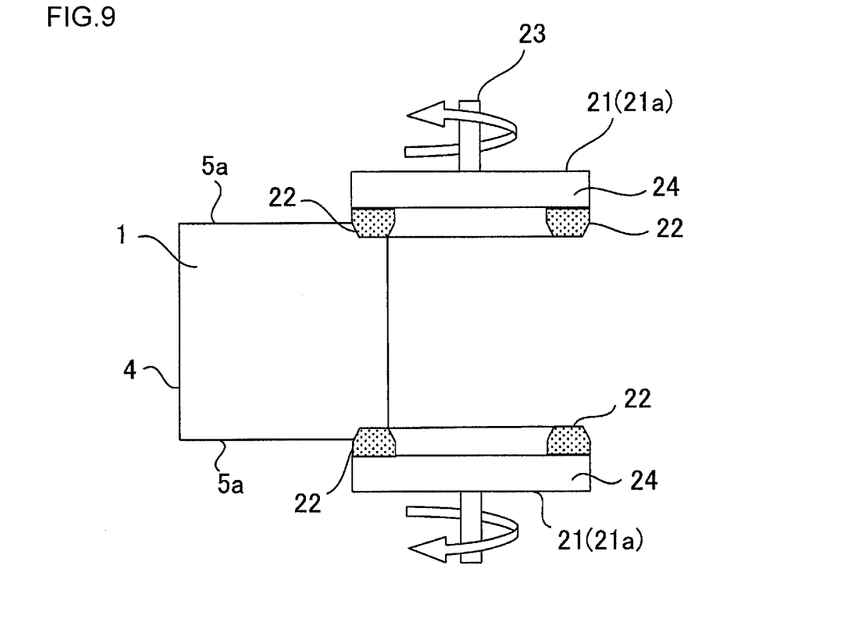
FIG. 9 is an explanatory view showing one example of the end face finishing step in which the cup type grinding wheel is used.
Figure 10:
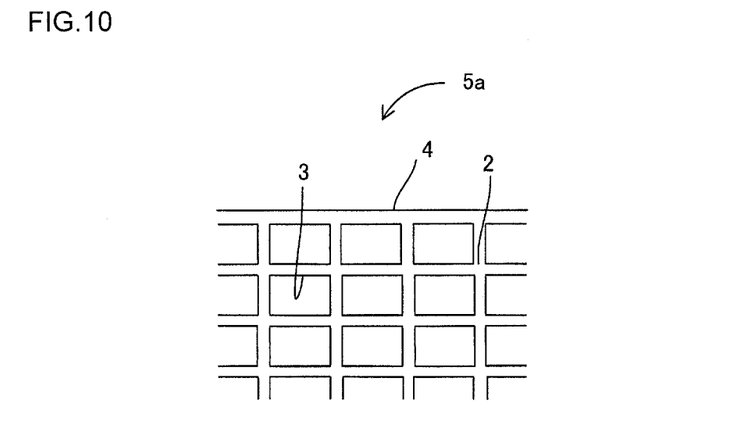
FIG. 10 is an explanatory view showing an end face of the honeycomb formed body which is cut by the cutting method of the present invention.

FIG. 9 shows the end face finishing step in which the cup type grinding wheel is used. As shown in FIG. 9, the finish-polishing grinding wheel 21 (the cup type grinding wheel) of the above constitution is rotated to polish and finish the cut surface 5a. The honeycomb formed body 1 which comes close to the finish-polishing grinding wheel 21 first comes in contact with the finishing abrasive grain layer 22 positioned on the tapered surface 26a of the finish-polishing grinding wheel 21. Further specifically, the circumferential portion of the honeycomb formed body 1 which includes the corner portion of the cut surface 5a comes in contact. Furthermore, it is preferable that the finish-polishing grinding wheel 21 is rotated at a rotation number of 2290 rpm or less. It is more preferable that the rotation number is 2290 rpm. As the rotation number of the finish-polishing grinding wheel 21 increases, a processing quality improves. In this way, the finish-polishing grinding wheels 21 are rotated round the rotary shaft of the central shaft 23, and the honeycomb formed body 1 is moved in a direction perpendicular to the rotary shaft to pass the honeycomb formed body between two finish-polishing grinding wheels 21, thereby finish-polishing the cut surfaces 5a which are cut, so that the honeycomb formed body 1 having the suitable cut surfaces 5a as shown in FIG. 10 can be finished.

(Manufacturing Method of Honeycomb Structure)

There will be described a manufacturing method of the honeycomb structure by using the cutting method of the honeycomb formed body 1 of the above-mentioned constitution. The manufacturing method includes a firing step of firing the honeycomb formed body 1 after a forming raw material is formed, the end faces 5 of the honeycomb formed body 1 having the partition walls 2 defining a plurality of cells 3 which become through channels for fluid and extend from one end face 5 to the other end face 5 and formed by extrusion, cutting and drying are roughly cut, and then the honeycomb formed body 1 is rotated round the rotation axis of the central axis perpendicular to the end faces 5 of the honeycomb formed body 1 to polish and finish the end faces.

Specifically, the forming raw material is first kneaded to form a kneaded material. To a main component suitable for a cell structure body or a raw material forming the suitable main component, a binder is added, a surfactant and water are further added, and this material is kneaded to form the kneaded material.

Next, this kneaded material is formed to obtain the honeycomb formed body 1 including the partition walls 2 defining the plurality of cells 3. There is not any special restriction on a forming method, but the extrusion is usually preferable. In this case, a formed body which does not include the outer wall 4 may be formed, but from a viewpoint of inhibiting deformation of the partition walls 2, it is preferable to form a formed body including the outer wall 4 which is monolithic with the partition walls 2. Afterward, the extruded honeycomb formed body 1 is rawly cut. In the raw cutting, the longitudinal uncut honeycomb formed body 1 extruded with an extrusion machine is cut into a predetermined length by use of a cutting tool such as a fine metal wire.

Next, the obtained honeycomb formed body 1 is dried with, for example, microwaves, induced electricity and/or hot air, or the like, and then the dried honeycomb formed body 1 is cut. The cutting is performed in the above-mentioned cutting step. That is, there are performed the end face cutting step of cutting both the end faces 5 of the ceramic honeycomb formed body 1 before fired, the honeycomb formed body rotating step of, after the end face cutting step, rotating the honeycomb formed body 1 round the rotation axis of the central axis perpendicular to the end faces 5 of the honeycomb formed body 1, and the end face finishing step of finish-polishing the cut surfaces 5a which are cut.

The honeycomb formed body 1 accurately processed and finished in a height direction by this cutting method is fired to obtain a honeycomb fired body. In this case, a firing temperature and atmosphere can suitably be changed in accordance with the raw material for use.

EXAMPLES

Hereinafter, the present invention will be described in more detail with reference to examples, but the present invention is not limited to these examples.

(1) Comparison by Presence/Absence of Honeycomb Formed Body Rotating Step

Examples 1 and 2 and Comparative Example 1

A kneaded material obtained by mixing and kneading a cordierite forming raw material, an organic binder and water was used to prepare a honeycomb formed body 1 by extrusion, and the honeycomb formed body was next rawly cut and then dried to fly and scatter water, thereby preparing a honeycomb dried body (an unfired body) having a round pillar shape in which a diameter was 150 mm, a honeycomb length was 90 mm, a partition wall thickness was 0.115 mm, and a cell density was 62 cells/cm$^2$ (400 cpsi). Then, the honeycomb dried body was cut and finish-processed by the following method. Here, in an end face cutting step, a blade type rough-cutting grinding wheel 11 having a grain size of #100 was used as a rough-cutting grinding wheel 11. In an end face finishing step, a cup type grinding wheel 21a having a grain size of #120 was used as a finish-polishing grinding wheel 21. Furthermore, there was formed a tapered portion 26 having an angle θ of 26°3' to be formed by a circumferential portion 24a of the cup type grinding wheel 21a on a grinding surface side.

End face cutting and end face finishing were performed while conveying the honeycomb formed body 1. After the end face cutting step, a cut 6 between an outer wall 4 and each partition wall 2 which had a size of 2.4 mm or less was generated in each cut surface 5a of the honeycomb formed body 1. In each of Examples 1 and 2, after the end face cutting step, a honeycomb formed body rotating step of the present invention was performed, and next the end face finishing step was performed. In Comparative Example 1, the honeycomb formed body rotating step was not performed, but the end face finishing step was performed. It is to be noted that Table 1 shows a rotation angle of the honeycomb formed body rotating step, a grinding depth of the end face finishing step, and a generating situation of the cut 6 between the outer wall 4 and the partition wall 2 in the honeycomb formed body 1. Additionally, a feed rate of the honeycomb formed body 1 was 80 mm/sec and a processing time was 1.9 sec.

TABLE 1

| | Processing conditions | | | Processing result | |
|---|---|---|---|---|---|
| | Honeycomb formed body rotating step (degrees) | Grinding depth (mm) | No. of inspected works (works) | No. of works in which cuts were generated (works) | Cut generation ratio (%) |
| Example 1 | 90 | 1.5 | 60 | 2 | 3 |
| Example 2 | 90 | 2.5 | 60 | 0 | 0 |
| Comparative Example 1 | 0 (no rotation) | 1.5 | 60 | 12 | 20 |

As seen from the results of Table 1, even in a case where cutting with the blade type rough-cutting grinding wheel 11 and processing with the cup type grinding wheel 21*a* were performed, it was possible to grind off the cut 6 between the outer wall 4 and the partition wall 2 by performing the honeycomb formed body rotating step, and a generation ratio of the cuts 6 noticeably decreased. Furthermore, when the honeycomb formed body rotating step was performed, it was possible to grind off all the cuts 6 by performing the grinding as much as a maximum depth of the cut 6 or more. Specifically, by application of the cutting method of the honeycomb formed body 1 of the present invention, it was possible to suitably finish processed surfaces (the cut surfaces 5*a*), and the method was suitable for industrial production.

(2) Comparison by Polishing Depth of End Face Finishing Step

Comparative Examples 2 to 4

A honeycomb formed body 1 having the same shape as in Examples 1 and 2 and Comparative Example 1 was cut and finish-processed by using a rough-cutting grinding wheel 11 and a finish-polishing grinding wheel 21 used in Examples 1 and 2 and Comparative Example 1. Furthermore, in Comparative Examples 2 to 4, a honeycomb formed body rotating step of the present invention was not performed. Table 2 shows a grinding depth of an end face finishing step, and a generating situation of a cut 6 between an outer wall 4 and each partition wall 2 in the honeycomb formed body 1.

TABLE 2

| | Processing conditions | | | Processing result | |
|---|---|---|---|---|---|
| | Honeycomb formed body rotating step (degrees) | Grinding depth (mm) | No. of inspected works (works) | No. of works in which cuts were generated (works) | Cut generation ratio (%) |
| Comparative Example 2 | 0 (no rotation) | 1.5 | 267 | 98 | 37 |
| Comparative Example 3 | 0 (no rotation) | 2.5 | 270 | 208 | 77 |
| Comparative Example 4 | 0 (no rotation) | 3.5 | 527 | 367 | 70 |

As seen from the results of Table 2, in a case where the honeycomb formed body rotating step was not performed, it was not possible to completely remove the cut 6 between the outer wall 4 and the partition wall 2. Furthermore, a depth of the cut 6 after an end face cutting step was 2.4 mm or less, but even when polishing was performed as much as 2.4 mm or more in each of Comparative Examples 2 and 3, it was not possible to completely remove the cut 6, and the cut 6 more deeply extended. Consequently, the method was not suitable for industrial production.

A cutting method of a honeycomb formed body of the present invention and a manufacturing method of a honeycomb structure are usable in manufacturing the honeycomb structure which is utilizable in a car exhaust gas purifying catalyst carrier, a diesel particulate removing filter, a heat reservoir for a combustion device or the like.

DESCRIPTION OF REFERENCE NUMERALS

1: honeycomb formed body, 2: partition wall, 3: cell, 4: outer wall, 5: end face, 5*a*: cut surface, 6: cut between the outer wall and each partition wall, 11: rough-cutting grinding wheel, 12: coarse abrasive grain layer, 13: grinding wheel substrate, 13*a*: circumferential surface (of the rough-cutting grinding wheel), 13*b*: disc surface (of the rough-cutting grinding wheel), 16: pressing member, 21: finish-polishing grinding wheel, 21*a*: cup type grinding wheel, 22: finishing abrasive grain layer, 23: central shaft, 24: substrate, 24*a*: circumferential portion (of the cup type grinding wheel), 26: tapered portion, 27: inner peripheral side tapered portion, 28: flat portion, D: central axis (of the honeycomb structure), R: rotating direction, α: angle (of a honeycomb structure rotating step), θ: angle to be formed, and H: height (of a finish-polishing abrasive grain layer).

What is claimed is:
1. A cutting method of a honeycomb formed body comprising:
an end face cutting step of cutting both end faces of a ceramic honeycomb formed body before firing to produce cut surfaces, by use of blade type rough-cutting grinding wheels in which abrasive grain layers are formed;
a honeycomb formed body rotating step of, after the end face cutting step, rotating the honeycomb formed body from 90° to 270° around a rotation axis which is a central axis perpendicular to the end faces of the honeycomb formed body so that a loaded region to which a load is applied when cutting the end faces is different from a loaded region to which a load is applied when finish-polishing the end faces; and an end face finishing step of, after the honeycomb formed body rotating step, disposing two finish-polishing grinding wheels via a predetermined distance so that finishing abrasive grain layers formed in the finish-polishing grinding wheels face each other, rotating the finish-polishing grinding wheels round a rotary shaft which is a central shaft of the finish-polishing grinding wheels, and moving the honeycomb formed body in a direction perpendicular to the rotary shaft to pass the honeycomb formed body between the two finish-polishing grinding wheels, thereby finish-polishing cut surfaces which are cut.

2. The cutting method of the honeycomb formed body according to claim 1,
wherein in the end face cutting step, a pair of blade type rough-cutting grinding wheels disposed to face the end faces of the honeycomb formed body are used, the rough-cutting grinding wheels are rotated round the rotation axis in a direction perpendicular to the end faces, and the honeycomb formed body is moved in a direction perpendicular to the rotation axis to pass the honeycomb formed body between the two rough-cutting grinding wheels, thereby cutting the end faces.

3. The cutting method of the honeycomb formed body according to claim 2,
wherein in the end face cutting step, the rough-cutting grinding wheels are rotated at a rotation number of 2300 to 2600 rpm.

4. The cutting method of the honeycomb formed body according to claim 1,
wherein each of the rough-cutting grinding wheels is disc-shaped, and the abrasive grain layer is formed on a circumferential surface and a disc surface of each grinding wheel.

5. The cutting method of the honeycomb formed body according to claim 1,
wherein a grain size of the rough-cutting grinding wheels is from #60 to #140.

6. The cutting method of the honeycomb formed body according to claim 1,
wherein the rough-cutting grinding wheels are formed by a metal bond.

7. The cutting method of the honeycomb formed body according to claim 1,
wherein in the end face finishing step, the cut surfaces are polished to a depth of 5 mm or less with the finish-polishing grinding wheels.

8. The cutting method of the honeycomb formed body according to claim 1,
wherein each of the finish-polishing grinding wheels is a cup type grinding wheel in which the finishing abrasive grain layer is formed on a surface of a circumferential portion of each finish-polishing grinding wheel, which circumferential portion faces the other finish-polishing grinding wheel.

9. The cutting method of the honeycomb formed body according to claim 1,
wherein in each of the finish-polishing grinding wheels, a tapered portion is formed on a grinding surface side of a circumferential edge of the finishing abrasive grain layers of each of the finish-polishing wheels.

10. The cutting method of the honeycomb formed body according to claim 9,
wherein an angle formed between a tapered surface of the tapered portion and a virtual extension line extended from the surface of the finishing abrasive grain layers disposed on the grinding surface of each of the finish-polishing wheels is set to a range of 26° to 31°, and a height of the tapered portion is 5 mm or more.

11. The cutting method of the honeycomb formed body according to claim 1,
wherein in the end face finishing step, the finish-polishing grinding wheels are rotated at a rotation number of 2290 rpm or less.

12. The cutting method of the honeycomb formed body according to claim 1,
wherein a grain size of the finish-polishing grinding wheels is from #100 to #140.

13. A manufacturing method of a ceramic honeycomb structure comprising:
a forming step of forming a ceramic honeycomb formed body by extruding a forming raw material to produce a honeycomb formed body having one end face and an other end face, and including partition walls defining a plurality of cells which become through channels for fluid and extend from one end face to the other end face,
a drying step of drying the honeycomb formed body to produce a dried honeycomb formed body,
the end face cutting step according to claim 1,
the honeycomb formed body rotating step according to claim 1,
the end face finishing step according to claim 1, and
a firing step of firing the honeycomb formed body to produce a honeycomb structure.

\* \* \* \* \*